PHONOGRAPH RECORD PLAYER MECHANISM

Filed Aug. 10, 1953 2 Sheets-Sheet 1

INVENTOR.
James E. Vistain Jr.
BY
J. D. Douglas
Att'y.

PHONOGRAPH RECORD PLAYER MECHANISM

Filed Aug. 10, 1953

2 Sheets-Sheet 2

INVENTOR.
James E. Vistain Jr.
BY
J. W. Douglas
Att'ys

United States Patent Office 2,898,117

Patented Aug. 4, 1959

2,898,117

PHONOGRAPH RECORD PLAYER MECHANISM

James E. Vistain, Jr., Skokie, Ill.

Application August 10, 1953, Serial No. 373,225

1 Claim. (Cl. 274—10)

This invention relates to new and useful improvements in phonograph record player mechanism and in particular to a combined turntable and centerpost, the centerpost being provided with magazine means for support of a stack of large center hole records above the turntable when the center holes of the records are passed over the post.

Among the improvements which are incorporated in the present invention are those which include simplicity of construction, convenience of repair or adjustment of the same and economy of manufacture.

Other advantages of the invention will be set forth in part hereinafter and in part will be obvious herefrom, or may be learned by practice with the invention, the same being realized and attained by means of the instrumentalities and combinations pointed out in the appended claim.

The accompanying drawings, referred to herein and constituting a part hereof, illustrate one embodiment of the invention and together with the description serve to explain the principles of the invention.

Figure 1:
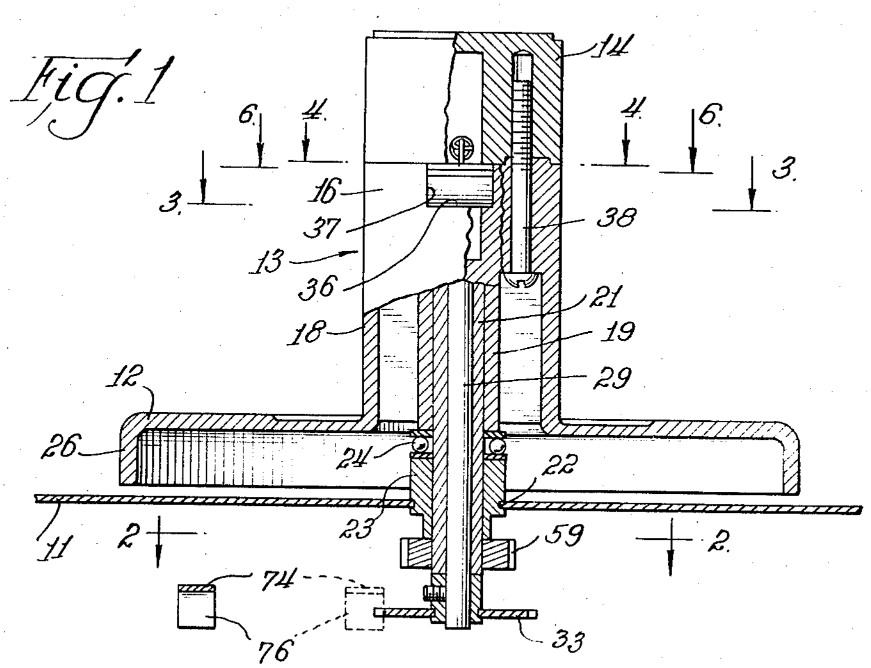
Fig. 1 is a fragmentary view of record player mechanism including a turntable and center post, the mechanism being shown in elevation and parts being broken away to further reveal structural features.
Figure 8:
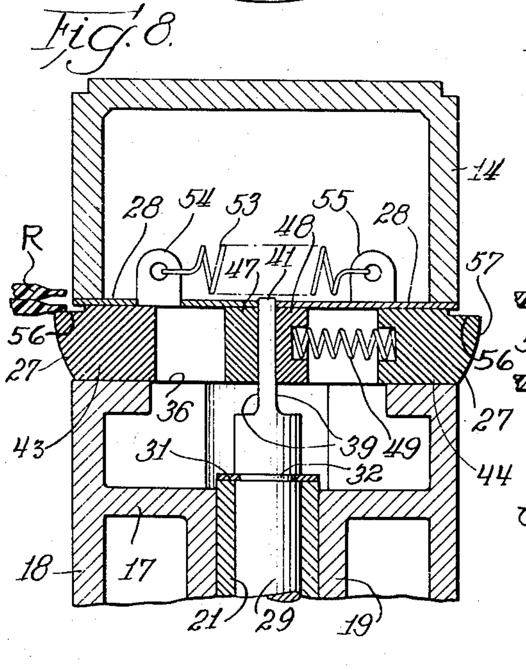
Fig. 8 is a fragmentary section taken on line 8—8 of Fig. 6.

Referring now to the drawings throughout which like elements are designated by like reference characters, in Fig. 1 is shown record player mechanism which includes a base plate 11, turntable 12 and center post 13. The post 13 is of such diameter as to accommodate the center hole of a 45 r.p.m. phonograph record. It includes a cap or crown portion 14 and a base portion 16, while the cap 14 unitary relative to the base, if desired, may be an integral part of the turntable. The turntable 12 and base 16, if made integral with each other, may be of suitable die cast metal or molded plastic material such as Bakelite. Consequently, the base 16 is generally tubular in structure and includes a transverse internal wall or web 17 (Fig. 8) normal to a peripheral wall 18, of uniform diameter. From the center of the transverse wall 17 an elongated boss 19 extends downward and has cast or molded therein a sleeve or hub 21 also extending downward but to a level below that of the boss 19.

For operation of the combined turntable and center post, the base 11 is apertured at 22 and thereat receives a fixed bushing 23 in which is journaled the hub 21. To carry the weight of the turntable and spindle the hub 21 additionally passes through a ball bearing 24 embraced by the bushing 23 and boss 19.

Any suitable motive unit, not shown, may be employed to drive the turntable and this may be effected by frictional engagement between a driven idler, of the unit, which is biased into engagement with the inner side of a peripheral depending flange 26 on the turntable.

Figures 2, 3:
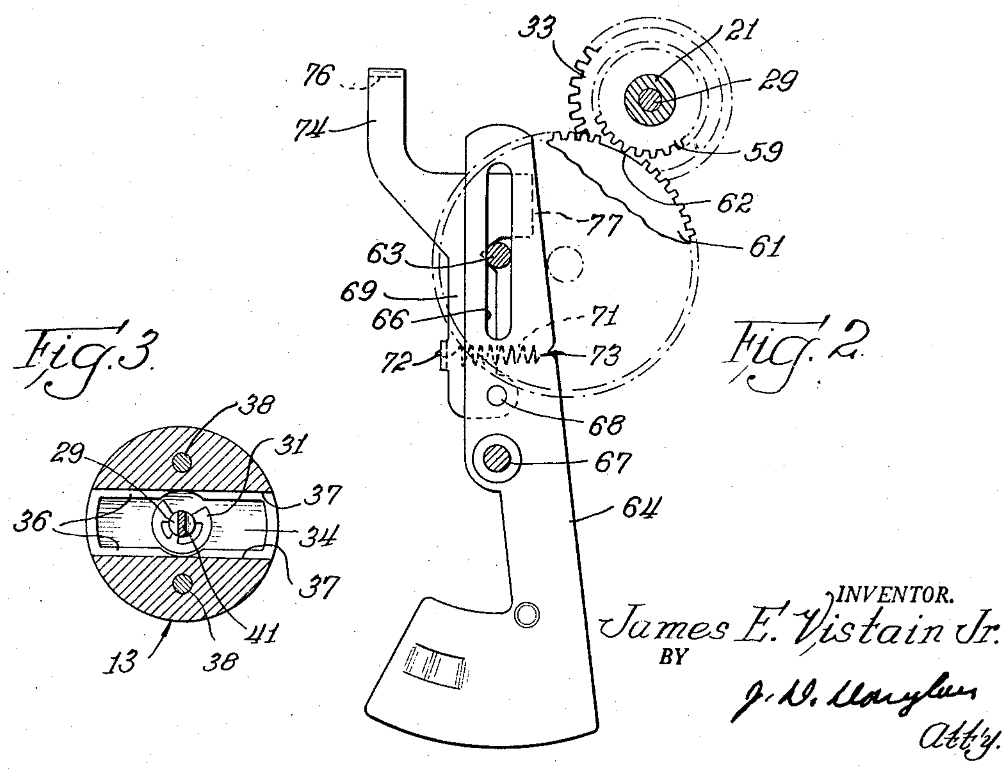
Fig. 2 is a section taken on line 2—2 of Fig. 1.
Fig. 3 is another section taken on line 3—3 of Fig. 1, after the turntable has rotated through a quarter turn.
Figure 9:
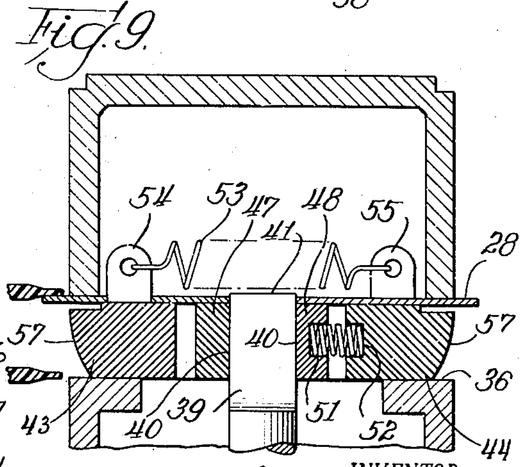
Fig. 9 is also a fragmentary view corresponding to Fig. 8, the magazine parts being in position for release of a record.

As will be noted (Figs. 8 and 9), a pair of record supports 27 are carried at the top of the base portion 16 for support of a stack of records R. Although the supports 27 normally extend beyond the periphery of the post they are retractable within said post, by means later to be described, to release the bottom record of the stack. To carry the records above the bottom record when the supports 27 are retracted, a pair of separators 28, disposed above the supports 27 and normally within the post, are moved outward of said periphery until they extend between the bottom record and the record immediately thereabove. The supports 27 and separators 28 are arranged to slide diametrically of the center post 13. In order that this may be effected the base portion 16 is provided with a recess 34 extending diametrically of its upper end, and having lower horizontal support ledges 36 (Fig. 3) between vertical side walls 37 of elevation from the ledges 36 at least equal to the combined thickness of the supports 27 and separators 28. The supports 27 and separators 28 are confined in the recess 34 by the cap 14 and have movement diametrically of the center post within predetermined limits to be indicated hereinafter. The upper limit of the recess 34 is therefore defined by the lower edge of the cap 14 and it may appropriately be anchored to the base portion 16 by a pair of screws 38 passing freely through the web 17 and in threaded engagement with the cap 14.

Both the supports 27 and the separators 28 derive motion for their operation from a shaft 29. The shaft is journaled in the hub 21 from a point below the level of which said shaft extends into the separators 28. To resist its axial displacement from this position the shaft 29 is grasped by a C-washer 31 inserted into an annular groove 32, just above the web 17. The washer 31, engages the upper end of hub 21, and resists downward displacement of the shaft. The shaft 29 is further anchored against upward movement relative to the post by a gear 33 fixed to its lower end adjacent the hub 21. At its upper end the shaft 29 is formed with opposed flats 39 which afford low sides between opposed high sides 40 of a cam or crank portion 41 extending upward at least to the level of the separators 28.

Figure 6:
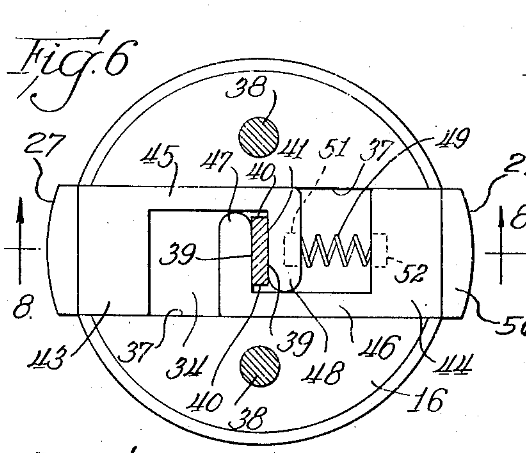
Fig. 6 is still another section taken on line 6—6 of Fig. 1, the center post being in the same angular position as is Fig. 3.

Novel structure is involved for cooperation between the supports 27 and the cam 41. To understand this, it should be noted that horizontally, the supports 27 are generally U-shaped (Fig. 6) and include head portions 43 and 44 on opposite sides of the post 13. On opposite side of the recess 34, arm portions 45 and 46 extend from the heads 43 and 44 past the cam 41 to lateral hooks 47 and 48 for engagement with opposite sides of the cam 41. More specifically, the hook 47 is disposed on the side of cam 41 remote from the head 44, while the hook 48 is at the side of the cam remote from the head 43. By this arrangement a single spring 49, under compression between one of the hooks and the nearest head portion, can be used to both bias the supports into hooked cooperation with the cam 41, and to provide a means by which the supports may be moved outward. One of the ends of the springs is received in a socket 51 in the hook 48 while its remaining end extends into a socket 52 in the head 44, as a safeguard against lateral displacement of the spring. While the hooks 47 and 48 are engaging low sides 39 of the cam, the supports are extending outward beyond the periphery of the post 13. By rotating the shaft to bring the hooks 47 and 48 into engagement with the high sides 40 of the cam, the supports are withdrawn within the periphery of said post, this motion being against the resistance of the spring 49.

The separators 28 are generally rectangular in formation and are constructed from sheet metal of a thickness adequate for their free ends to slide readily between adjacent records of a stack without disturbing the records. Suitable separators were made from sheet brass .020 of an inch in thickness. They are confined in intimate slidable association with the supports 27 by the sides 37 of the recess 34 and the cap 14. Additionally, the separators 28 are biased toward each other by a tension spring 53 the respective ends of which are hooked to vertical ears 54 and 55 on said separators, to provide constant engagement thereof with the adjacent sides of the cam 41. When the separators 28 are normally cooperating with the low sides 39 of the cam they are within the periphery of the post 13 but are of length adequate to extend well beyond the periphery of said post when they engage the high sides 40 of the cam 41.

In order to enable the supports 27 to sustain the records at such a level that the operation of the separators 28 will be in the same horizontal plane as that of the upper surface of the bottommost record, the depth of the outer ends of said supports are reduced as at 56. From the outer edge of the surface 56 the supports 27 slope inward toward the axis of the device thereby providing removal cams 57. When it is desired to remove played records from the turntable, they are slid upward over the center post until the edges of the center holes engage the cams 57. The ensuing cooperationg between the cams and said records is adequate to move the supports inward, against the spring 49 until the records are past the supports.

Both the supports 27 and the separators 28 are arcuate at their outer extremities, as indicated, so that no sharp surfaces are presented to the passage of the records thereover.

Figure 4:
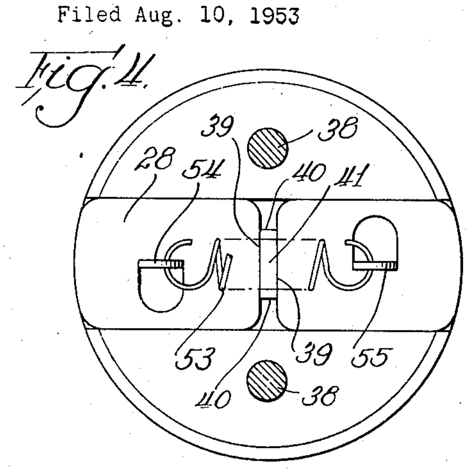
Fig. 4 is an additional section taken on line 4—4 of Fig. 1, the center post being rotated to its Fig. 3 position.
Figure 5:
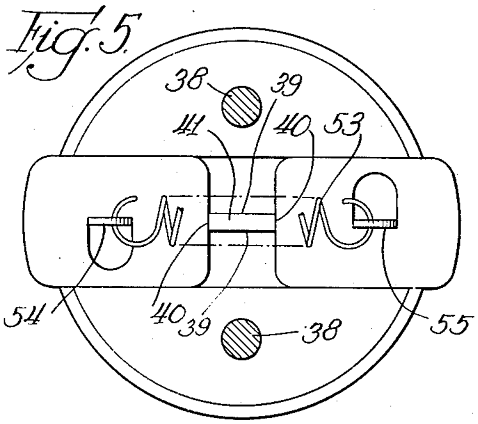
Fig. 5 is a section corresponding to Fig. 4 but with parts in a position differing from their Fig. 4 position.
Figure 7:
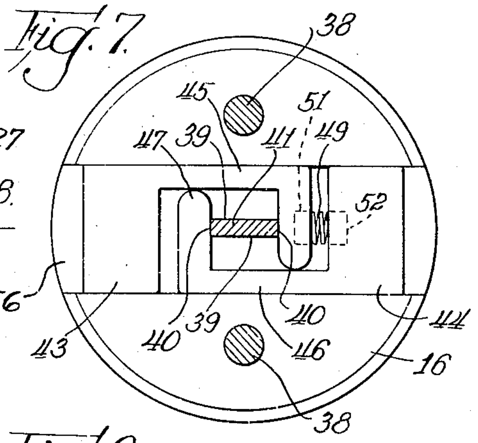
Fig. 7 is a section corresponding to Fig. 6 showing the position occupied by parts when the bottom record, of a stack of records, is released.

It will be apparent that when in their normal position; that is, when the record player is tracking a record, the supports 27 afford support for a stack of records, the center post extending through their center holes. It will also be apparent that as the post 13 is turned, relative to the cam 41, to carry the hooks 47 and 48 concurrently with the separators 28 away from their over-the-center position (Figs. 5 and 7) that the force of springs 49 and 53 tend to assist the turning motion of the post until it has reached a state of equilibrium (Figs. 4 and 6) after which the springs yieldably resist additional rotation of the post relative to the shaft. Due to this feature the shaft 29 is normally driven with the post 13 and turntable 12. When the shaft is held against rotation, however, and the post consequently turns about said shaft, the supports 27 are retracted within the periphery of said post as the cam 41 urges the hooks 47 and 48 away from each other, and concurrently, the separators 28 being cammed apart are extended between the record resting on the supports and the record immediately above the bottom record. The separators 28 therefore provide support for the records above the bottom record when the record supports 27 are retracted sufficiently within the post to release the bottom record. In the course of cyclic operation of the record player the separators 28 are thus extended and then retracted to their normal position when the center post makes a half turn around the shaft 29.

From the constantly driven turntable 12 motion is derived for moving stop means into engagement with the gear 33 for interrupting its motion and releasing a record to the turntable as previously described. For this to be effected, the hub 21 has fixed thereto a pinion 59 cooperatively associated with a cyclically driven member 61 preferably taking the form of a mutilated gear having a blank space 62 at its periphery which is normally adjacent the pinion 59. In response to operation of manual, or alternately automatic means, neither of which is shown, the mutilated gear 61 is turned through an increment of motion sufficient to initiate meshed engagement with the pinion 59 whereupon said gear is driven substantially through one revolution after which it stops since the blank space 62 is returned to its normal position in proximity to the pinion 59. In the meantime a pin or follower 63, extending downward from the mutilated gear is carried through a predetermined course. In association with the follower 63 is a lever or stop carrier 64 formed with a slot or cam 66 therein into which the follower 63 extends for movement longitudinally thereof as it swings the lever about a pivot 67 thereof, on the base plate 11. To the lever 64, in turn, at 68 is pivoted a stop arm 69 which is biased clockwise about its axis by a tension spring 71 anchored to an ear 72 on the stop arm and to the lever 64 at a notch 73. The force of the spring 71 is resisted, however, by the follower 63 engaging the right hand side of the arm 69. For its cooperation with the gear 33, the stop arm 69 includes an offset portion 74, extending in a plane slightly above the level of said gear to a finger 76 at the end of the offset portion, the finger being bent downward and terminating in a free end below the level of the gear 33. As will be noted, the plane of finger 76 is substantially radial to the axis of the gear 33 so that when the follower 63 is carried through its course the finger 76 is yieldably brought into engagement with the gear 33 and is operatively inserted between the teeth thereof to arrest its rotation and that of the shaft 29 and cam 41 so that the supports 27 and separators 28 are operated to release a record from the stack in the manner already described. The arm 69 is formed with a shoulder 77 thereon, opposite the offset portion 74 for timing of the release of finger 76 from the gear, said shoulder bearing against the follower 63 at the middle of a cycle.

Although I have described one embodiment of my invention I am aware that numerous and extensive departures may be made therefrom without departing from the spirit or scope of my invention.

I claim:

A record changer wherein the records are supported on a center post and discharged therefrom onto a turntable including a center post, a pair of record supports radially and slidably disposed near the upper end of said center post for supporting a stack of records, a pair of record separators radially and slidably disposed on top of said supports, operating means for said supports and separators including a shaft extending into the center post and independently rotatable relative to the center post, said shaft formed with opposed flat surfaces at the upper end thereof, said flat surfaces of said shaft disposed medially between each of said supports and similarly disposed medially between each of said separators for operative association therewith, each of said record supports formed with a head portion extending to an arm portion and terminating in a hook, said hook of each support extending beyond the shaft and into engagement with one of the flat surfaces on the shaft on the opposite side from its respective head portion, first spring means interposed between the head of one support and the hook of the other support biasing the supports outwardly from said flat surfaces of said shaft, said first spring means biasing the hooks of said supports into engagement with said flat surfaces, said separators each having an inner end disposed in abutting engagement with one of said opposed flat surfaces on said shaft, and second spring means biasing said separators towards each other and into contact with said flat surfaces, said shaft rotatably operable to radially retract said pair of supports and simultaneously extend said pair of separators for the release of records singly to the turntable.

References Cited in the file of this patent

UNITED STATES PATENTS

| | | |
|---|---|---|
| 2,287,098 | Habegger | June 23, 1942 |
| 2,576,125 | Lapish | Nov. 27, 1951 |
| 2,634,135 | Carson | Apr. 7, 1953 |
| 2,643,127 | Gregg et al. | June 23, 1953 |
| 2,666,648 | Dale | Jan. 19, 1954 |
| 2,683,039 | Fortune | July 6, 1954 |
| 2,706,639 | Sperber | Apr. 19, 1955 |